United States Patent [19]

Crespin

[11] Patent Number: 4,665,293

[45] Date of Patent: May 12, 1987

[54] DEVICE FOR PIERCING A HOLE THROUGH A METAL WORKPIECE BY ELECTRICAL DISCHARGE

[75] Inventor: Gerard Crespin, Villeurbanne, France

[73] Assignee: Framatome & Cie., Courbevoie, France

[21] Appl. No.: 667,921

[22] Filed: Nov. 2, 1984

[30] Foreign Application Priority Data

Nov. 4, 1983 [FR] France .................. 83 17525

[51] Int. Cl.⁴ .................... B23H 9/14; B23H 1/00
[52] U.S. Cl. .................. 219/69 V; 204/129.7; 204/224 M
[58] Field of Search ............ 219/69 V, 69 E, 70, 219/69 M, 69 R; 204/129.7, 224 M

[56] References Cited

U.S. PATENT DOCUMENTS

| | | | |
|---|---|---|---|
| 2,263,412 | 11/1941 | Armentrout | 219/69 M |
| 2,731,538 | 1/1956 | Sherman et al. | 219/69 V |
| 3,053,965 | 9/1962 | Kintzel | 219/69 V |
| 3,337,709 | 8/1967 | Bugher | 219/69 V |
| 3,469,056 | 9/1969 | O'Connor | 219/69 V |
| 3,506,559 | 4/1970 | Bonga | 204/224 M |
| 3,668,105 | 6/1972 | Abt | 204/224 M |
| 4,020,313 | 4/1977 | Koga et al. | 219/69 E |
| 4,083,767 | 4/1978 | Suslin et al. | 204/224 M |
| 4,104,503 | 8/1978 | Di Piazza et al. | 219/69 M |
| 4,259,562 | 3/1981 | Cammann et al. | 219/69 V |
| 4,366,358 | 12/1982 | Inoue | 219/69 M |
| 4,565,914 | 1/1986 | Suzaki et al. | 219/69 R |

FOREIGN PATENT DOCUMENTS

| | | | |
|---|---|---|---|
| 1023537 | 1/1958 | Fed. Rep. of Germany | 219/69 R |
| 1540697 | 5/1969 | Fed. Rep. of Germany | 219/69 R |
| 1236608 | 7/1959 | France | 219/69 G |
| 55-5223 | 1/1980 | Japan | 204/224 M |
| 616832 | 1/1949 | United Kingdom | 219/69 V |
| 800061 | 8/1958 | United Kingdom | 219/69 V |
| 846971 | 9/1960 | United Kingdom | 219/69 V |
| 1047643 | 11/1966 | United Kingdom | 219/69 E |
| 1014676 | 4/1983 | U.S.S.R. | 219/69 M |

Primary Examiner—A. D. Pellinen
Assistant Examiner—Geoffrey S. Evans
Attorney, Agent, or Firm—Pollock, Vande Sande & Priddy

[57] ABSTRACT

The device includes an electrode in the form of a cylindrical tube, an arrangement for causing an electrical discharge between the electrode and the workpiece, a support fixed to the workpiece and disposed at least partly inside the electrode for guiding the electrode in a direction perpendicular to the workpiece and electromagnetic structure placed inside the electrode to cause the electrode to vibrate.

8 Claims, 2 Drawing Figures

DEVICE FOR PIERCING A HOLE THROUGH A METAL WORKPIECE BY ELECTRICAL DISCHARGE

FIELD OF THE INVENTION

The invention concerns the machining of metal workpieces by electrical discharge. It applies, in particular, to the piercing of a hole through a metal workpiece.

PRIOR ART

Conventional devices for machining by electrical discharge incorporate a full electrode provided with a vibrator, of fixed 50 Hertz frequency, which imparts its movement to the electrode. An electrical signal is sent through the electrode so as to cause an electrical discharge, of short duration, between the electrode and the metal workpiece to be machined at the moments when the electrode is at a certain distance from the workpiece, thus creating a plasma and thereby the removal of material.

Although these conventional devices for machining by electrical discharge give satisfactory results in a general way, they do not allow holes of large diameter to be pierced with good results.

In fact, in these devices, the vibrations of the vibrator are generated by electromagnetic means which use as a source an electrical signal which is synchronized with the signal sent through the electrode to cause the electrical discharge between the electrode and the workpiece. However, the electrical discharge only takes place if the distance between the electrode and the workpiece has a certain magnitude at the moment when the voltage and the intensity of the current supplying the electrode reach their maximum values. As the displacements of the vibrating electrode are functions of the inertia of the assembly formed by the electrode and its system of connection to the vibrator, when this inertia is too great, which is the case when piercing holes of large diameter, synchronization between the displacements of the electrode and the voltage and intensity of the current at 50 Hz supplying the electrode is difficult; the commencement of the electrical discharge, and therefore the machining of the workpiece, are consequently almost impossible.

It would be possible to overcome this disadvantage by reducing the frequency of the current supplying the electrode, but the machining time would thus be increased.

Another disadvantage of conventional devices for machining by electrical discharge resides in the fact that the electrode is only guided at its end portion, and therefore over a short length. This poor guidance gives the electrode a degree of additional freedom, in the direction perpendicular to that of machining; a greater volume of material is thus removed, which increases the machining time; in addition, the work carried out cannot be accurate.

SUMMARY OF THE INVENTION

The present invention overcomes the disadvantages of the aforementioned devices. The aim of the invention is a device for machining by electrical discharge, allowing a large hole to be pierced in a metal workpiece, with very good machining speed, excellent guidance of the electrode and high accuracy.

More specifically, the invention concerns a device for machining by electrical discharge intended for piercing an open cylindrical hole through a metal workpiece, incorporating an electrode, a dielectric liquid in which are immersed the portions for the electrode in contact with the workpiece, means for guiding the electrode in a direction normal to the workpiece, means for causing an electrical discharge between the electrode and the workpiece and means for causing the electrode to vibrate axially.

According to the invention, the electrode is a cylindrical tube whose shape and external dimensions correspond to those of the hole to be pierced.

In a preferred embodiment of the device according to the invention, the electrode is mounted around a support tube along which it is capable of sliding; the support tube is positioned against the metal workpiece, perpendicular to the latter, in the region of the hole to be pierced, by the intermediary of a foot, and is provided with means for holding the tube in this position.

According to a first characteristic of this embodiment, the electrode is mounted around the support tube by the intermediary of a sleeve.

The sleeve is preferably provided with means for displacement in longitudinal translation and for control of this displacement.

According to a second characteristic of this embodiment, the sleeve and the electrode are provided with electromagnetic means cooperating with one another to cause the electrode to vibrate.

According to another characteristic, the foot is pierced with at least one passage communicating with at least one tube positioned inside the support tube and maintained at a negative pressure so as to cause the dielectric liquid to circulate, continuously replenished along the outside wall of the electrode.

According to another characteristic, the foot is pierced with at least one passage opening onto the metal workpiece, on one side, and onto at least one tube positioned inside the support tube and maintained at a negative pressure so as to hold against the foot the slug formed in the metal workpiece during the machining.

Advantageously, the means for holding the support tube against the metal plate consist of a bridge firmly fixed to the support tube and fixed to the plate by means of suction pads.

BRIEF DESCRIPTION OF THE DRAWINGS

In order that the invention may be better understood, it is described below in greater detail with respect to a preferred embodiment, described only by way of example and shown in the accompanying drawings.

DETAILED DESCRIPTION

Figures 1, 2:
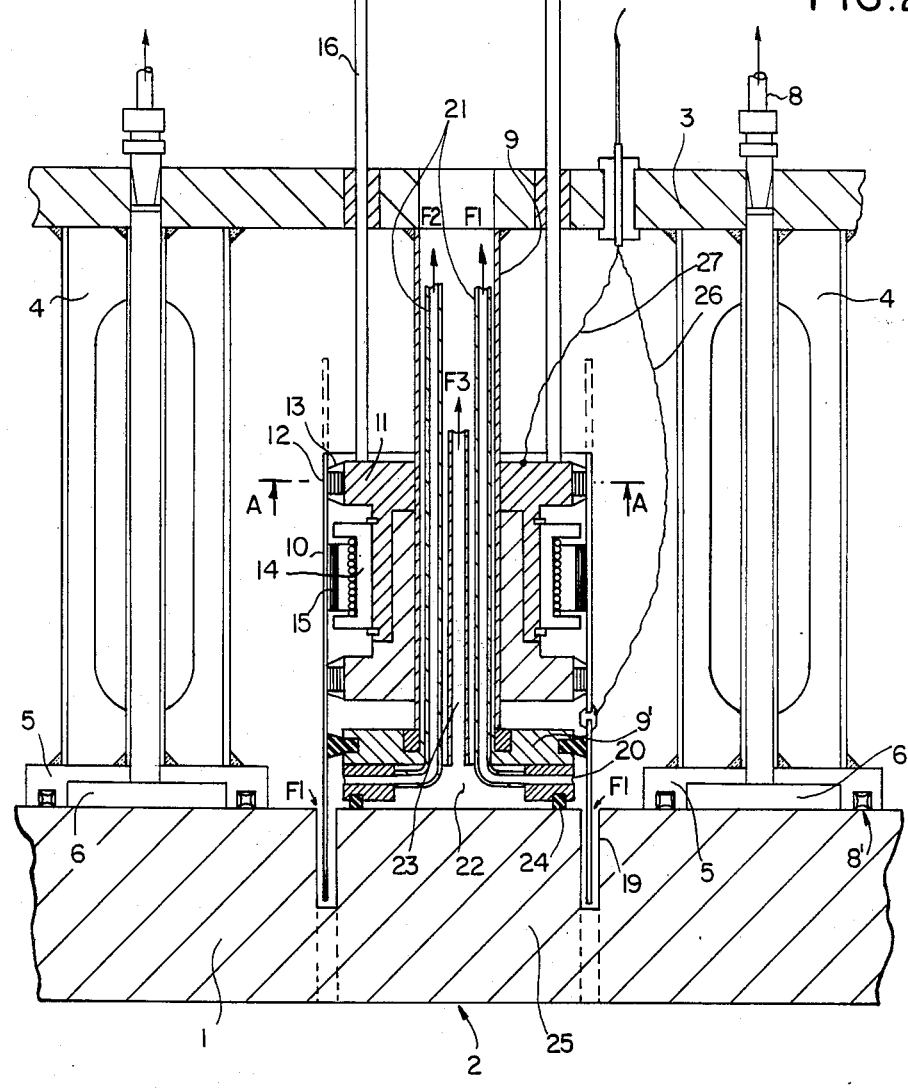
FIG. 1 shows a longitudinal section of a device according to the invention during machining of a metal workpiece upon which it is fixed.
FIG. 2 shows a section along line A—A shown in FIG. 1.

The device according to the invention is intended for piercing through a metal workpiece 1 an open hole whose position is given the reference 2.

The diameter of the hole to be pierced may, for example, be in the region of 60 mm.

A bridge, consisting of a plate 3 supported by at least two cylinders 4 fixed to the metal plate to be pierced 1 forms the support for the device according to the invention. The cylinders 4 are pierced with apertures so as to allow them to be decontaminated, in the case where the machining to be carried out takes place in an irradiated environment. The cylinders 4 are each closed by an end portion 5 forming, with the metal plate 1, a sealed chamber 6 which may be held at a negative pressure by the intermediary of a tube 7, one end of which opens into the chamber 6 and whose other end opens into a passage 8 forming a vacuum connection. The chambers 6 thus form suction pads which enable the bridge to be fixed upon the metal workpiece to be machined.

The bridge also incorporates a tube 9, one end of which is welded to the plate 3 in its central position, and the other end of which terminates in a foot 9' which is held against the metal workpiece. In the embodiment shown, since the metal workpiece 1 is flat, the tube 9 is, of course, of the same length as the cylinders 4: it is thus held in a fixed position throughout the machining operation. In the case where the metal workpiece has a more complex surface, the cylinders 4 and the tube 9 can, of course, be of different lengths.

The tube 9 forms a support tube along which the device for machining is capable of sliding.

The device for machining consists of an electrode mounted around the support tube 9 by the intermediary of a sleeve 11. The electrode 10 incorporates pegs 12 corresponding to splines 13 in the sleeve 11 and is thus subjected to the same movements in translation as the sleeve 11 when the latter slides along the support tube 9. There is nevertheless a slight axial play, (of 5 to 10 mm, for example), between the pegs 12 and the splines 13 so that the electrode 10 may be subjected to vibrations (of 5/10 mm, for example). For this purpose, the sleeve 11 incorporates a housing for a coil 14 which, when excited by a current, can cooperate with a magnet 15 of annular shape fixed to the inner wall of the electrode 10 so as to cause the electrode to vibrate relative to the sleeve 11 and therefore relative to the workpiece to be machined 1, the frequency of these vibrations being, of course, a function of the current supplied to the coil 14. The sleeve 11 has, in this case, been made in two pieces so as to facilitate the mounting of the coil 14; it is made of an insulating material, for example hard polyurethane.

The sleeve 11 is joined by the intermediary of guide rods 16 and a connecting plate 18 to a device 17 for controlling the displacements in longitudinal translation of the electrode 10 as the machining operation progresses. The device 17, firmly fixed to the plate 3 of the bridge by means which are not shown, incorporates a stepping motor whose operation, in the conventional manner, depends on the position of the electrode 10. The amplitude of longitudinal displacement of the electrode 10 is a function of the thickness of the workpiece to be machined 1.

The electrode 10 is made of brass, but at its lower end which carries out the actual machining, it may be made of a conducting material which is more resistant to wear, such as the material marketed under the name "SPARKAL". In FIG. 1, the electrode 10 is shown in the course of a machining operation; i.e. it has already created an annular depression 19 in the metal workpiece 1. In order that the device can operate, it is, of course, necessary that this depression 19 be continuously filled with dielectric liquid, for example water. For this purpose, the dielectric liquid is introduced along the outer wall of the electrode 10, in the depression 19, as indicated by the arrows f1. The liquid then rises along the inner wall of the electrode 10.

During machining, the dielectric liquid becomes charged with spherical particles which are the machining waste which it is necessary to remove. For this purpose, the foot 9' is pierced with passage 20 each communicating with tubes 21 positioned inside the support tube 9. During machining, these tubes 21 are held at a negative pressure in order to remove the dielectric liquid which is charged with spherical particles, as indicated by the arrows f2.

The foot 9' also incorporates a chamber 22 opening onto the metal workpiece 1, on one side, and onto a tube 23 positioned inside the support tube 9, and sealed by means of seals 24. During machining, suction means, not shown, positioned at the end of the tube 23 opposite the chamber 22, enable the chamber 22 to be held at a negative pressure, as indicated by the arrow f3. This negative pressure enables the slug 25 formed in the metal workpiece during machining to be held against the foot 9'. The slug 25 may thus, when machining is completed, be withdrawn together with the device for machining.

A cable 26 supplies the electrode 10. The supply is of a high current, low voltage type so as to cause an electrical discharge between the electrode 10 and the workpiece 1. An electric cable 27 supplies the coil 14 in order to make the electrode 10 vibrate. This supply is of the low voltage, low current type. The electrical signal common to the supply of the coil 14 and to the supply of the electrode 10 has a frequency of 50 Hertz or a multiple of 50 Hertz. It is non-rectified alternating current, or preferably full-wave rectified current.

The operation of the device according to the invention is as follows: The bridge supporting the device by means of the suction pads 6 is placed in position. The electrode 10 is brought close to the workpiece 1 by means of the device 17. The vibrations of the electrode are started and the latter is supplied with current so as to cause electrical discharges. The sparking phenomenon takes place, causing machining of the workpiece 1. The device 17 allows the electrode to be advanced in accordance with the progress of the machining. When the latter is completed, the device is withdrawn together with the slug 25.

The device described above has numerous advantages. It enables the workpiece 1 to be machined in a rapid manner, firstly because the quantity of material to be removed is small since the electrode is tubular and is guided over a great length, and secondly because the frequency of the electrical discharges can be high since the inertia of the workpieces is, in this case, low (the only workpiece which is vibrating is the electrode, and not an assembly consisting of the electrode and its system of connection to the vibrator) and allows the use of high frequency full-wave rectified current without prejudicing good synchronization between the displacements of the electrode and the voltage and intensity of the current supplying the electrode.

In addition, the device according to the invention enables very accurate machining to be carried out due to the very good guidance of the electrode by the intermediary of the sleeve.

Also, the waste material produced during machining is of a limited quantity owing to the fact that the material removed is of low volume; this small quantity of waste material is effectively removed through the passages 21. The slug which remains after machining is also removed very easily owing to the negative pressure maintained in the tube 23.

It may also be noted that the device according to the invention enables holes of large diameter to be pierced on site, in areas where it would be difficult to work with conventional tools such as taps. The device according to the invention, in fact, occupies a small space, and can work in various positions, and particularly in the horizontal position. The device according to the invention can therefore be used to pierce the thermal shield of a nuclear reactor so as to be able to introduce plugs into the partitioning of the store. The water containing boron of the reactor pool can then be used as a dielectric, the water charged with spherical particles, and removed through tubes 21, being recycled by means of a filter before being returned to the bath.

What is claimed is:

1. Device for piercing a hole through a metal workpiece by electrical discharge, comprising
   (a) an electrode constituted by a cylindrical tube whose shape and external dimensions correspond to those of the hole to be pierced;
   (b) means for causing an electrical discharge between said electrode and said workpiece;
   (c) a support fixed to said workpiece in the region of said hole to be pierced and disposed at least partly inside said electrode for guiding the latter in a direction perpendicular to said workpiece;
   (d) first electromagnetic means placed inside said electrode and fixed to said electrode; and
   (e) second electromagnetic means cooperating with said first electromagnetic means to cause said electrode to vibrate.

2. Device as claimed in claim 1, wherein said electrode is mounted around said support by the intermediary of a sleeve.

3. Device as claimed in claim 2, wherein said sleeve is provided with means for displacement of said electrode in longitudinal translation and for control of such displacement.

4. Device as claimed in claim 2 or 3, wherein said second electromagnetic means are fixed to said sleeve.

5. Device as claimed in claim 1 or claim 2, wherein said support comprises a tube and a foot provided with means for holding said tube in position on the workpiece.

6. Device as claimed in claim 5, wherein said foot (9') is pierced with at least one passage (20) communicating with at least one tube (21) positioned inside said support and maintained at a negative pressure so as to cause dielectric liquid to circulate, continuously replenished along an outside wall of said electrode (10).

7. Device as claimed in claim 5, wherein said foot (9') is pierced with at least one passage (22) opening onto said metal workpiece (1), on one side, and onto at least one tube (23) positioned inside said support tube (9) and maintained at a negative pressure so as to hold against said foot (9') a slug (25) formed in said metal workpiece (1) during machining.

8. Device as claimed in claim 1, comprising means for holding said support tube (9) against said metal workpiece (1), said holding means comprising a bridge (3, 4) firmly fixed to said support (9) and fixed to said metal workpiece (1) by means of suction pads (5, 6).

* * * * *